Sept. 14, 1965  G. H. THOMAS ETAL  3,205,713
TRANSISTORIZED VIBRATION MEASUREMENT APPARATUS
Filed April 4, 1962
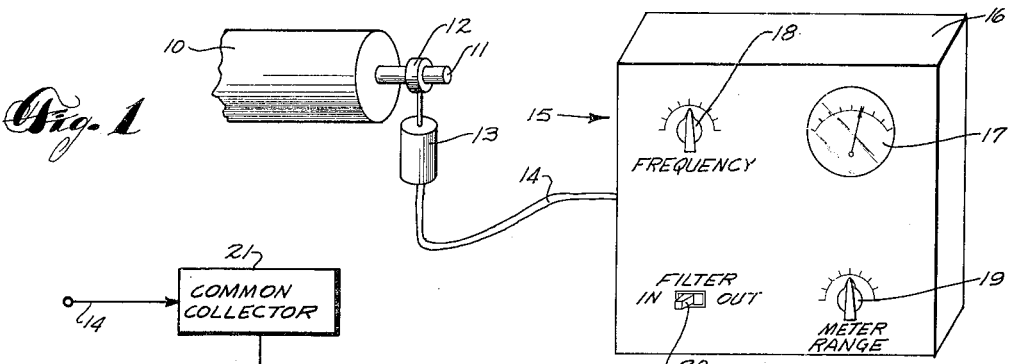
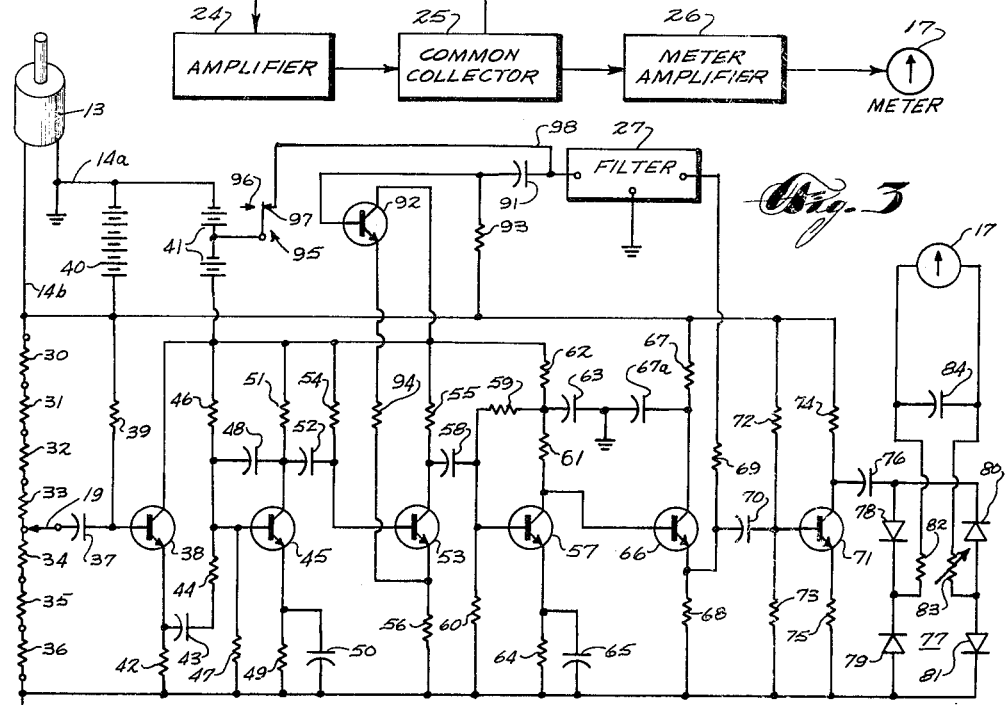
INVENTORS
GLEN H. THOMAS &
ROBERT S. MORROW
BY
ATTORNEY 3,205,713
TRANSISTORIZED VIBRATION MEASUREMENT APPARATUS
Glen H. Thomas, Columbus, and Robert S. Morrow, Worthington, Ohio, assignors to International Research and Development Corporation
Filed Apr. 4, 1962, Ser. No. 185,023
5 Claims. (Cl. 73—462)

This invention relates to electronic vibration measuring apparatus for determining the amplitude of mechanical vibrations of rotating objects such as rotors, wheels and the like.

More particularly this invention is related to transistorized circuitry for mechanical vibration measurement from a velocity-type mechanical vibration transducer which is engaged with a fixed element in which such objects are rotating.

The electronic measurement of mechanical vibration amplitude is well-known in the art of vibration analysis. An electromagnetic transducer of the velocity type is engaged with a fixed element such as a wall of a bearing in which the rotor is turning. Unbalance forces of the rotor create vibrations in the bearing which generate a sinusoidal electrical signal in the velocity-type transducer. Such transducers are described in U.S. Patent 2,754,435, July 10, 1956, assigned to the assignee of this invention. The resulting electrical signal is directed through electronic circuitry to drive a microammeter which is suitably calibrated to indicate directly the amplitude of the bearing wall vibration. Such electronic circuitry includes:

(a) Integration means—for integrating the velocity-coordinated transducer signal to a displacement-coordinated signal;

(b) Amplifier means—for increasing the electrical potential of the integrated signal;

(c) Filter means—for selecting the fundamental component of the electrical signal (or some specific harmonic multiple of the fundamental) and to eliminate undesired harmonic components and noise frequencies;

(d) Meter means—which may include a meter amplifier to increase the electrical potential of the integrated signal and rectifier bridge means for converting the integrated signal to a direct current value which can be indicated on a direct current ammeter.

Heretofore attempts to provide transistorized circuitry for accomplishing these results have failed principally because of excess "transistor noise" which was inherent in circuits which involved element-for-element substitution of transistor devices for electron tubes of theretofore acceptable vibration measuring circuitry. Attempts to include a notch-type variable filter also proved troublesome.

According to the present invention, successful vibration measuring circuitry is provided for accurate detection of mechanical vibration levels from velocity-type transducers.

The present circuitry includes:

A notch-type variable filter stage;
Seven transistor stages including:
 Integrator stage;
 Mixer stage;
 Two amplifier stages; and
 Three common collector stages.

The present invention further includes a novel means for rapid activation and deactivation of the notch-type variable filter by providing a direct current bias charge on such filter during its deactivation periods so that its condensers remain charged during deactivation, yet any alternating current pulses applied to the filter will be grounded through a battery source.

The principal objects of this invention include:

To provide a transistorized circuitry for indicating directly the magnitude of mechanical vibrations which are represented by electrical signals emanating from a velocity-type transducer engaged with a rotating element which generates the vibrations;

To provide transistorized vibration measuring apparatus which includes a notch-type variable filter for measurement of vibrations at many different predetermined vibration frequencies;

To provide a switching means in vibration measuring apparatus which permits rapid activation and deactivation of such variable filter means; and To provide a compact, lightweight, portable vibration measurement apparatus.

These and other objects of this invention will become apparent from the following detailed description by reference to the accompanying drawings in which:

FIGURE 1 is a perspective illustration of a rotor, a velocity-type transducer and a carrying case containing the present measuring apparatus;

FIGURE 2 is a block diagram of the present circuitry; and

FIGURE 3 is a schematic drawing of the present circuitry; and

FIGURE 4 is a schematic drawing of a preferred notch-type variable filter for use in the present circuitry.

Referring to FIGURE 1, there is illustrated a rotor 10 having a shaft 11 mounted in a bearing 12. A velocity-type electromagnetic transducer 13 engages the bearing 12 and, upon vibration of the bearing 12, generates a corresponding electrical signal which is delivered through a cable 14 to a compact vibration measuring apparatus 15 of this invention. The apparatus 15 is contained within a compact casing 16. The casing 16 holds a direct current microammeter 17, a potentiometer knob 18, and two switches 19, 20. The switch 19 provides a plurality of taps for selection of a suitable range for the microammeter 17. The switch 20 serves to activate and deactivate an internal variable filter. The potentiometer knob 18 serves to vary the tuned frequency of the internal variable filter.

FIGURE 2 illustrates the essential internal components of the present apparatus. The input signal from the cable 14 passes sequentially through a common collector stage 21, an integrator stage 22, a mixer stage 23, an amplifier stage 24, a common collector stage 25, and a meter amplifier stage 26 to the direct current microammeter 17 having an associated meter bridge circuit. The output signal from the common collector stage 25 also passes through a variable notch filter 27 which attenuates those components of the signal which correspond to the tuned frequency of the filter 27. Those components of the signal which do not correspond to the tuned frequency of the filter 27 are delivered to a common collector stage 28 and are introduced into the mixer stage 23 as a negative feedback signal.

The integrator stage 22 serves to convert the input signal from cable 14 from a velocity-responsive signal (generated by the transducer 13) to a displacement signal corresponding to the actual vibration of the bearing 12. That integrated signal is mixed with the negative feedback signal in the mixer 23 which cancels all components of the input other than those corresponding to the tuned frequency of the filter 27. The uncancelled signal from the mixer 23 is amplified in the amplifier stage 24 and delivered to the microammeter 17 to indicate directly the amplitude of the mechanical vibrations.

The common collector stage 21 separates the integrator stage 22 from the transducer cable 14. The common collector 21 has a high input impedance confronting the transducer cable 14 and a low output impedance confronting the integrator stage 22. The common collector 25 similarly has a high input impedance confronting the amplifier stage 24 and a low output impedance confronting the filter stage 27. Similarly the common collector stage 28 has a high input impedance confronting the filter stage 27 and a low output impedance confronting the mixer stage 23. Thus the common collectors provide a high impedance for the transducer to feed into; a low input impedance and high output impedance for the filter stage; and a high impedance for the amplifier to feed into.

The use of planer silicon transistors permits the development of low-noise values throughout a relative wide range of frequencies, i.e., over the range of frequencies normally encountered in mechanical vibration studies, from about 500 cycles per minute to about 150,000 cycles per minute.

Referring to FIGURE 3, the transducer 13 delivers an alternating signal through conductors 14a, 14b. The conductor 14a is grounded. The conductor 14b is connected to ground through a series of resistors 30, 31, 32, 33, 34, 35, 36 which are separated by switch taps engageable with the switch 19. The resistors 30, 31, 32, 33, 34, 35, 36 serve as a voltage divider to attenuate the input signal as desired. By suitable selection of a switch tap, the switch 19 delivers an input signal through a coupling capacitor 37 to the base of a common collector input stage transistor 38 of high input impedance. The base is fixed biased through base bias resistor 39.

Two voltage sources 40, 41 are provided at different potentials. The voltage source 40 is at a relatively high potential (e.g., 30 volts D.C.) where the voltage source 41 is at a relatively low potential (e.g., 12 volts).

The emitter of the transistor 38 is connected to ground through an emitter resistor 42. The collector of the transistor 38 is connected to the low voltage source 41.

The output of the common collector transistor 38 is coupled through a coupling capacitor 43 and delivered through an integrating resistor 44 to the base of a common emitter integrator transistor 45. The base of the integrator transistor 45 is single-battery-biased by bias resistors 46, 47. An integrating capacitor 48 is connected between the base and collector of the integrating transistor 45. The emitter of integrating transistor 45 is connected to ground through an emitter resistance 49 and a by-pass capacitor 50. A collector resistor 51 connects the collector of the integrating transistor 45 to the voltage source 41.

The output of the integrator transistor 45 is delivered through a coupling capacitor 52 to the base of a common emitter mixer transistor 53 which is fixed biased by the base bias resistor 54. The collector of the mixer transistor 53 is connected through a collector resistor 55 to the voltage source 41. The emitter of the mixer transistor 53 is connected to ground through an emitter resistor 56 without any by-pass capacitors whereby degeneration is permitted in order to achieve linearity of output. This arrangement provides the feedback voltage from the filter 27 in directly coupled relation from a common collector transistor 92 to the emitter of the mixer transistor 53 as will be hereinafter apparent.

The output of the mixer transistor 53 is coupled to the base of a common emitter amplifier transistor 57 through a coupling capacitor 58. The base of the amplifier transistor 57 is single-battery-biased through base bias resistors 59 and 60. A collector resistor 61 connects the collector of the amplifier transistor 57 with a decoupling network including a decoupling resistor 62 and a grounded decoupling capacitor 63. The emitter of the amplifying transistor 57 is connected through emitter resistor 64 in parallel with a bypass capacitor 65 to ground.

The output of the amplifier transistor 57 is directly coupled to the base of a common collector transistor 66. The collector of the common collector transistor 66 is connected to the high voltage source 40 through a decoupling resistor 67 and isolated from ground through a decoupling capacitor 67a. The emitter of the common collector transistor 66 is connected to ground through an emitter resistor 68.

The output of the common collector transistor 66 is delivered to the filter 27 through a decoupling resistor 69 and also is coupled through a coupling capacitor 70 to the base of a common emitter meter amplifier transistor 71. The base of the meter amplifier transistor 71 is single-battery-biased through base bias resistors 72, 73. The collector of the meter amplifier transistor 71 is connected to the high voltage source 40 through a collector resistor 74. The emitter of the meter amplifier transistor 71 is connected to ground through an emitter resistor 75. The common emitter meter amplifier transistor prevents overloads greater than fifty percent on the microammeter 17 regardless of the magnitude of the transducer input signal.

The output of the meter amplifier transistor 71 is coupled through a coupling capacitor 76 to a meter bridge circuit 77.

The meter bridge circuit 77 includes parallel connected pairs of opposed diodes 78, 79 and 80, 81. The microammeter 17 is connected in series with meter resistor 82 and variable resistor 83 between the common points of the opposed diodes 78, 79 and 80, 81. A meter capacitor 84 is shunted across the microammeter 17 to control the damping of the meter.

The filter 27 preferably is a twin-T filter of the type illustrated in FIGURE 4 and described in copending application S.N. 7,951 filed February 10, 1960, now U.S. Patent 3,072,868, and assigned to the assignee of this invention. The filter of FIGURE 4 includes a pair of series-connected resistors 85, 86 having their common point connected to ground through a shunt capacitor 87. In parallel with the series resistors is a pair of series connected capacitors 88, 89 having their common point connected to ground through a shunt resistor 90. The resistor 85 is variable to permit control of the tuned frequency of the filter.

The output of the filter 27 is coupled through a coupling capacitor 91 to the base of a common collector transistor 92. The base of the common collector transistor 92 is fixed biased through base bias resistor 93 to the high voltage source 40. The collector of the common collector transistor is connected to the low voltage source 41. The emitter of the common collector transistor 92 is coupled through the emitter resistor 94 to the emitter of the mixer transistor 53.

The resistor 56 forms a joint emitter return to ground for the transistors 53 and 92. Thus the output of the common collector transistor 92 serves as a feedback signal at the emitter of the mixer transistor 53. That feedback signal is mixed with the signal output of the integrator transistor 45 which is coupled to the base of the mixer transistor 53. The resultant signal is capacity coupled to the base of the amplifier transistor 57. The common collector transistor 92 presents high input impedance to avoid overloading of the filter 27 yet presents a low impedance output for directly driving the mixer transistor 53 at its emitter.

*Filter switching*

When the filter 27 is deactivated, the present transistorized measuring apparatus can be utilized over frequency ranges from about 450 to 150,000 cycles per minute, so long as the input signal from the transducer is relatively clean. With the filter 27 activated, the present apparatus can be utilized over frequency ranges from about 500 to 15,000 cycles per second.

The switching means of this invention is illustrated by the two-position switch 95 having its swing-arm connected to a pole of the battery source 41 whereby the direct current potential of the swing-arm is maintained at approximately the normal potential of the filter 27. One tap 96 of the switch 95 is in open contact. The other tap 97 is connected to the filter output through a conductor 98. When the swing-arm of the switch 95 is joined to the open tap 96, the filter is activated and is connected in the circuitry. The connection from the battery 41 through the swing-arm of the switch 95 is in open contact. However when the swing arm of the switch 95 is connected to the tap 97, the filter output is connected directly to the battery 41 at a direct current potential which approximates the normal charge on the capacitors of the filter 27 and also the normal charge on the coupling capacitor 91. Thus the capacitors retain their normal direct current charge and hence are immediately available for service without requiring any finite time for recharging. Any alternating current signals delivered through the filter 27 are transmitted directly to ground through the conductor 98, the switch 95 and the battery 41.

We claim:

1. In transistorized vibration analyzing apparatus for attenuating all signals other than those of a preselected frequency, the combination of an electromechanical transducer for converting mechanical vibrations into a velocity coordinated signal, a transistor integrator operatively connected to said transducer for converting the velocity coordinated signal into a displacement coordinated signal, a first common collector transistor stage interposed between and coupling the transducer and the integrator, a mixer stage coupled to the output of said integrator, means including a second common collector transistor stage coupled to the output of the mixer stage, a filter apparatus coupled to the output of said second common collector stage, said filter apparatus being adapted to attenuate a selected frequency component and to pass as a negative feedback signal all other frequency components, a third transistor common collector stage for applying the output of said filter apparatus as a negative feedback to the mixer such that the output of the third transistor common collector stage is mixed in said mixer with the output of said integrator, and means for deriving an output signal from the second transistor common collector stage comprising those components of the integrator output which occur at the said selected frequency.

2. In transistorized vibration analyzing apparatus of the type including an electromechanical transducer for converting mechanical vibrations into a velocity coordinated signal, a transistor integrator for converting the velocity coordinated signal into a displacement coordinated signal, and filter means coupled to the output of said integrator for selecting the fundamental component of said displacement coordinated signal and for eliminating all undesired harmonic components and noise frequencies and to deliver said fundamental component as an output signal; the improvement in said filter, means which comprises a mixer coupled to the output of said integrator, a feedback path including signal filtering apparatus which attenuates the said fundamental component and passes as a negative feedback signal all other components of the said integrator output, means for delivering said negative feedback signal to said mixer where it is mixed with the output of said integrator, and common collector transistor stages coupling the mixer to the filter apparatus and the filter apparatus to the mixer, each transistor common collector stage providing a high input impedance and a low output impedance, and output signal means responsive to the output of said mixer.

3. In combination, a filter comprising a mixer stage, means for applying an input signal to said mixer stage, a feedback path including signal filtering apparatus which attenuates a selected frequency component and passes as a negative feedback signal all other frequency components, means connecting the output of said mixer to said signal filtering apparatus, means connecting the said negative feedback signal to the input of the mixer to be mixed with the input signal applied thereto, switch means for alternately connecting and disconnecting the filtering apparatus to said mixer, said signal filtering apparatus including condensers, and means for maintaining a direct current potential on said condensers when the filtering apparatus is disconnected from the mixer, the arrangement being such that the condensers will be immediately available for service when the filtering apparatus is again connected to the mixer without requiring any finite time for recharging, the output of said mixer comprising the input signal when the said filtering apparatus is disconnected and comprising the sum of the said input signal and the said negative feedback signal when the said filtering apparatus is connected.

4. In transistorized vibration apparatus of the type including an electromechanical transducer for converting mechanical vibrations into a velocity coordinated signal, a transistor integrator operatively connected to said transducer for converting the velocity coordinated signal into a displacement coordinated output signal, and filter means coupled to the output of said transistor integrator for passing a signal of a preselected frequency while attenuating signals of all other frequencies; the improvement in said filter means comprising a mixer coupled to the output of said transistor integrator, a feedback path coupling the output of the mixer to the input of the mixer such that the signal from the feedback path is mixed with the output of said integrator, a twin-T notch filter in the feedback path, capacitors in the twin-T notch filter, a coupling capacitor in the feedback path for coupling the twin-T notch filter to said mixer, and means including a switch device for selectively applying a bias potential to the junction of the twin-T filter and the coupling capacitor whereby the filter will be effectively disconnected from the mixer while the coupling capacitor and the capacitors in said twin-T filter will retain their normal direct current charge and will be immediately available for service when again effectively connected to the mixer without requiring any finite time for recharging.

5. In transistorized vibration analyzing apparatus, the combination of an electromechanical transducer for converting mechanical vibrations into a velocity coordinated signal, a transistor integrator for converting the velocity coordinated signal into a displacement coordinated signal, a first common collector transistor stage interposed between and coupling the transducer and the integrator, a mixer stage coupled to the output of said integrator, means including a second common collector stage coupled to the output of the mixer stage, a twin-T notch filter coupled to the output of said second common collector stage, said filter including capacitive elements therein, a coupling capacitor and a third transistor common collector stage for applying the output of said twin-T notch filter to the mixer such that the output of the third transistor common collector stage is mixed in said mixer with the output of said integrator, means including a switch device for selectively applying a bias potential to the junction of the twin-T filter and the coupling capacitor whereby the filter will be effectively disconnected from the mixer while the coupling capacitor and the capacitive elements in said filter will retain their normal direct current charge and will be immediately available for service when again effectively connected to the mixer without requiring any finite time for recharging, and means for deriving an output signal from the second transistor common collector stage, the arrangement being such that when the filter is effectively disconnected from the mixer, signals of all frequencies at the output of the integrator will appear at said last-named means, while effective connection of the filter to the mixer will serve to attenuate all signals other than those of a selected frequency which will appear at said last-named means.

References Cited by the Examiner

UNITED STATES PATENTS

| | | | |
|---|---|---|---|
| 2,196,031 | 4/40 | Schildmeier | 73—467 |
| 2,731,835 | 1/56 | Hellar et al. | 73—463 |
| 2,754,679 | 7/56 | Petroff | 73—71.4 |
| 2,924,977 | 2/60 | Kenyon et al. | 73—465 |
| 2,970,478 | 2/61 | Crawford et al. | 73—467 |
| 3,002,376 | 10/61 | Crampton et al. | 73—71.4 |
| 3,076,342 | 2/63 | Hilgers | 73—462 |

OTHER REFERENCES

Pages 70–80, Networks, Lines and Fields, a text-book by Ryder, and published by Prentice-Hall in 1949.

Page 8, Transistor Reference Guide, published by General Electric Co. (Copyright 1953.)

RICHARD C. QUEISSER, *Primary Examiner.*

ROBERT L. EVANS, *Examiner.*